Patented June 2, 1942

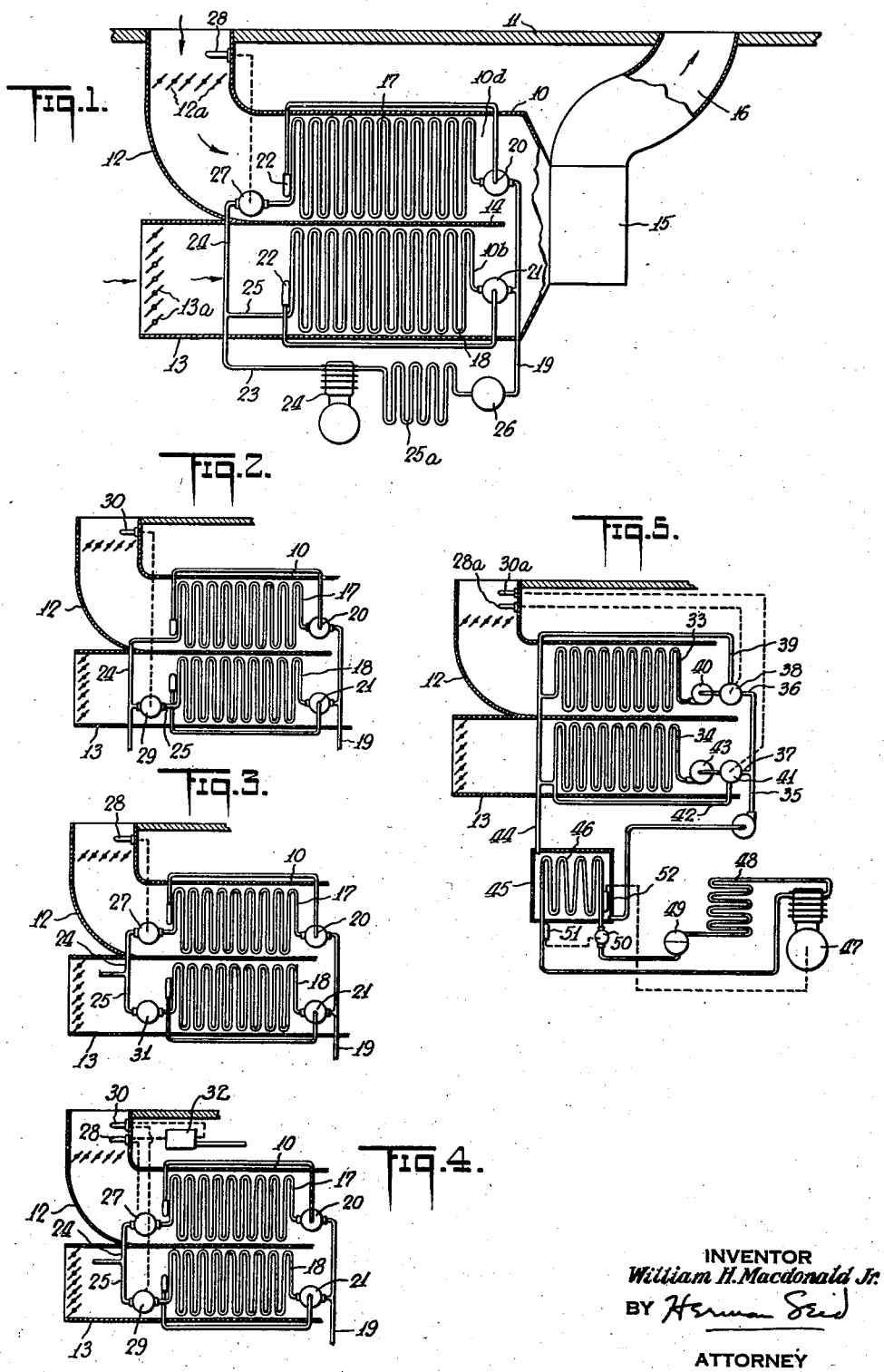

2,285,042

UNITED STATES PATENT OFFICE 2,285,042

AIR CONDITIONING APPARATUS

William H. Macdonald, Jr., Rochelle Park, N. J., assignor to Carrier Corporation, Syracuse, N. Y., a corporation of Delaware Application July 8, 1938, Serial No. 218,087

1 Claim. (Cl. 62—6)

This invention relates to air conditioning, and more particularly to air conditioning systems of the type employing refrigeration.

The general object of the invention is to provide an improved air conditioning system for controlling the temperature and moisture content of air supplied to an enclosure for maintaining desired atmospheric conditions therein.

Another object of the invention is to provide an improved air conditioning system in which provision is made for separately controlling the temperature and the moisture content of air supplied to a conditioned enclosure by contacting different portions of the air to be conditioned with different heat exchange surfaces, the temperatures of which surfaces are individually regulated to provide such conditioning action that the different portions of the conditioned air, when intermingled subsequent to conditioning, will possess desired characteristics of temperature and humidity.

Other objects of the invention are to provide an improved air conditioning system which is adapted to control individually the dry bulb temperature and moisture content of air supplied to a conditioned enclosure in a manner which is relatively simple, but which gives assurance that desired atmospheric conditions will be maintained in the conditioned enclosure at all times, regardless of variations in air conditioning load; which comprises relatively few elements and is relatively inexpensive; and which is highly reliable in operation.

A feature of the invention resides in cooling a first portion of an air stream in accordance with changes in the dry bulb temperature of a conditioned enclosure, cooling and dehumidifying a second portion of the air stream in accordance with changes in humidity conditions in said enclosure, and supplying both of said air stream portions to said enclosure.

Another feature of the invention resides in passing the air to be conditioned in contact with two or more heat exchange devices arranged with respect to the air flow therover, so that different portions of the air stream contact with different heat exchange devices, utilizing at least one of the devices to regulate desirably the moisture content of the conditioned air, and utilizing at least another of the devices to regulate desirably the dry bulb temperature of the conditioned air.

Another feature of the invention resides in utilizing a plurality of direct expansion heat exchange devices for contact and heat exchange with different portions of an air stream to be conditioned and supplied to a conditioned area, and regulating the operation of said devices to control the moisture content and dry bulb temperature of air delivered to the conditioned enclosure, said devices being arranged in parallel with respect to the flow of refrigerant therethrough and being served by a common compressor apparatus.

Another feature of the invention resides in conditioning different portions of an air stream by contacting said different portions of the air stream with different direct expansion heat exchange devices arranged in parallel with respect to refrigerant flow therethrough, at least one of said devices being adapted and operated primarily to effect reduction of the moisture content of the air passing in contact therewith and at least another of said devices being adapted primarily to regulate the dry bulb temperature of the air passing in contact therewith, the operation of said devices being controlled by regulating the surface temperature of one or more of said devices in accordance with changes in air conditioning load requirements.

Other objects, features and advantages of the invention will be more clearly apparent from the following description, to be read in connection with the accompanying drawing, in which:

Fig. 1 diagrammatically represents an air conditioning system embodying the invention;

Figs. 2-4 diagrammatically represents modified forms of the invention; and

Fig. 5 diagrammatically represents a modification of the invention employing secondary heat exchange, rather than direct expansion, for conditioning the treated air.

Referring to the drawing, numeral 10 designates an air conditioning casing adapted to receive air from conditioned enclosure 11 through duct 12 and from the outdoor atmosphere through duct 13, the proportions of return air and outdoor air delivered to the casing being controlled by dampers 12a and 13a, in ducts 12 and 13, respectively. While the airs delivered to the casing 10 may be intermingled, if desired, it is preferred to route these airs through the conditioner casing 10 in substantially unmixed condition. Accordingly, duct 12 is arranged to discharge return air through the upper portion 10a of the conditioner casing while duct 13 is adapted to discharge outdoor air through lower section 10b of the conditioner casing. If desired, a partition 14 separating the upper portion 10a of the casing from the lower portion 10b thereof may be provided to give further assurance against the intermingling of return air and outdoor air supplied to the conditioner casing. Fan 15 withdraws air from both portions of the conditioner casing 10 and supplies it to enclosure 11 through supply duct 16.

In the upper portion 10a of the conditioner casing there is provided a direct expansion refrigerant evaporator 17 adapted to occupy the entire cross sectional area of the casing section 10a, so that all portions of the air stream passing through the section 10a are contacted with the evaporator 17. Similarly, in the lower portion 10b of the conditioner casing there is provided evaporator 18 arranged to be contacted by all portions of the air passing through the conditioner casing portion 10b. Liquid refrigerant is supplied to both evaporators through liquid supply line 19, the evaporators 17 and 18 being arranged in parallel with respect to liquid supply line 19. Liquid refrigerant is supplied to the evaporator 17 under the control of expansion valve 20, the operation of which is controlled by thermal bulb or the like 22 at the outlet end of evaporator 17 in a manner well known in the art. Similarly, liquid refrigerant is supplied to evaporator 18 under the control of expansion valve 21, regulated by thermal bulb or the like 22 located at the outlet end of evaporator 18. The evaporators 17 and 18 are connected in parallel to suction line 23 through branch connections 24 and 25 respectively. Evaporated refrigerant withdrawn through suction line 23 is compressed by compressor 24 and condensed in condenser 25a, of any suitable type, and is then delivered to receiver 26 for delivery to the evaporators.

The evaporator 17, serving the air withdrawn from the conditioned enclosure, is adapted primarily to effect the removal of sensible heat from the air contacting therewith. The evaporator 18, serving the air withdrawn from the outdoor atmosphere, is adapted to remove both sensible heat and latent heat from the air contacting therewith, the primary function of evaporator 18 being the removal of latent heat.

In the branch connection 24 there is provided a back pressure regulating valve 27 under the control of a dry bulb thermostat 28 which may be positioned in the return duct 12, as illustrated, or at any other point where it may be subjected to the atmospheric dry bulb temperature prevailing in the conditioned enclosure 11. As the temperature affecting the thermostat 28 rises, the degree of opening back pressure regulating valve 27 is somewhat increased. The increased opening of valve 27 causes a reduction of the pressure obtaining within the evaporator 17 and hence the evaporator operates at a somewhat reduced temperature to offset and correct the increasing dry bulb temperature affecting the thermostat 28. This operation continues until the thermostat is satisfied. Conversely, when the temperature affecting thermostat 28 is too low, the valve 27 is closed somewhat, so that the evaporator 17 operates at a higher pressure and hence at a higher temperature, so that less cooling effect due to the operation of evaporator 17 is supplied to the conditioned enclosure.

When the valve 27 is closed somewhat to increase the pressure in evaporator 17 there results a decrease of pressure in the evaporator 18, due to the continued operation of compressor 24 and due to the parallel arrangement of evaporators 17 and 18. When the operating temperature of evaporator 18 is so reduced, this evaporator provides increased cooling and dehumidifying effect. Conversely, when valve 27 is opened more widely, to provide more cooling by evaporator 17, the pressure and temperature of evaporator 18 rise and hence there is less cooling and dehumidification by evaporator 18. In the embodiment of the invention illustrated in Fig. 1, the dry bulb temperature of the conditioned enclosure is maintained within desired limits by the action of thermostat 28, and while the relative humidity of the enclosure varies somewhat in this embodiment of the invention, this variation is within a range which is neither excessively great nor uncomfortable.

If it is desired to maintain the moisture content or relative humidity of the conditioned enclosure within predetermined and close limits, the arrangement of Fig. 2 may be utilized. In this modification of the invention, the back pressure regulating valve 27 is eliminated and a back pressure regulating valve 29 is provided at the outlet end of evaporator 18 in branch connection 25. Valve 29 is under the control of control instrument 30 which may be a wet bulb thermostat or hygrostat, as desired, located at any desired point in the system, as in the return duct 12. Employing this arrangement will maintain a wet bulb temperature or relative humidity, according to the instrument employed, within close limits while the dry bulb temperature within the conditioned enclosure will vary somewhat. The operation of the embodiment illustrated in Fig. 2 is essentially the same as that of the embodiment illustrated in Fig. 1.

It is to be understood, of course, that in all embodiments of the invention the sizes of the heat exchangers 17 and 18 are such that the heat exchanger 18 will have sufficient capacity to effect all required dehumidification under maximum load conditions and the heat exchanger 17 will have sufficient capacity to effect all required sensible cooling under maximum load conditions which is not effected by heat exchanger 18. By properly proportioning the coil surface of the different cooling coils, the normal variation of sensible heat to total heat can be accommodated with no appreciable change of temperature or relative humidity in the space conditioned, and the system will be substantially self-balancing.

Fig. 3 illustrates a modification of the invention which is identical with Fig. 1, except that there is provided, in the branch connection 25 leading from evaporator 18, an automatic pressure regulating valve 31, of any desired and well-known type adapted to prevent the pressure in evaporator 18 from falling below a predetermined point. Thus while thermostat 28 and back pressure regulating valve 27 continue to provide close control of the dry bulb temperature, the pressure regulating valve 31 serves to prevent excessive sensible cooling and dehumidification by the evaporator 18 during those intervals when the valve 27 is in relatively restricted position.

In substantially the same manner as pointed out in connection with Figs. 1 and 2, the construction of Fig. 3 may be modified by providing in the branch connection 25 a back pressure regulating valve such as 29, suitably controlled by a hygrostat or wet bulb thermostat such as control instrument 30, such valve replacing the valve 31 in connection 25. In such case, the valve 27 in branch connection 24 might be replaced by an automatic pressure regulating valve similar to valve 31. Thus modified, the arrangement of Fig. 3 would be operative to closely control the wet bulb temperature or relative humidity of the conditioned enclosure and would prevent the temperature of the evaporator 17 from falling below a predetermined point.

The arrangement of Fig. 4 provides for the close control of both the dry bulb temperature and the relative humidity of the atmosphere of the conditioned enclosure, or of the dry bulb and wet bulb temperatures thereof. As illustrated, back pressure regulating valve 27 in branch connection 24 is under the control of dry bulb thermostat 28, and back pressure regulating valve 29 is under the control of a hygrostat or wet bulb thermostat 30. Thus the pressure and temperature of evaporator 17 are regulated to insure the maintenance of desired dry bulb temperature conditions in the conditioned enclosure, and the pressure and temperature of evaporator 18 are regulated to insure the maintenance of desired wet bulb temperatures or relative humidities in the conditioned enclosure.

Under normal operating conditions, refrigerant will flow through both evaporators 17 and 18 continuously, the refrigerant flow being modulated by the expansion valves 20 and 21 and the back pressure regulating valves provided with one or both of the evaporators. However, the compressor driving means (not shown) may be provided with a well-known low pressure cut-out so that the operation of the refrigerating system may be interrupted when the pressure in the suction line 23 falls below a predetermined point. Further, it is to be understood that any suitable means for variably regulating the capacity of the compressor in accordance with variations in load requirements may be provided, if desired, without departing from the invention. One such arrangement which may be utilized is disclosed in copending application Serial No. 71,837, filed March 31, 1936, assigned to applicant's assignee.

As above set forth, the invention satisfactorily operates under operating conditions serving as the basis for the design of the system. Occasionally, however, extreme and unusual operating conditions are encountered which might tend to upset the balanced control of both temperature and relative humidity. Thus in the case of an extremely high latent heat load, the dry bulb temperature of the air in the enclosure might tend to drop below permissible limits, if it is attempted to maintain the moisture content of the air in the enclosure within the normal operating range. To meet such conditions, and to prevent the indoor dry bulb temperature from falling below a predetermined minimum, applicant provides a relay control device 32 which is adapted in well-known manner, when the dry bulb thermostat 28 is subjected to a predetermined low temperature, to prevent further opening of the valve 29 by hygrostat or wet bulb thermostat 30. It is to be understood that any suitable stop means or the like may be utilized in conjunction with the valve 29 for limiting the opening thereof when the dry bulb temperature of the conditioned enclosure tends to become too low, without departing from the invention. For example, if the hygrostat 30 variably controls the supply of compressed air to valve 29, in the well known manner, for variably regulating the action of the valve, then there may be provided in the compressed air line leading to the hygrostat 30 a device such as the C3 leak port cumulator, manufactured by the Johnson Service Company, which will reduce the amount of compressed air supplied to the hygrostat whenever the dry bulb temperature affecting the thermostat falls below a predetermined point, and thus serve to limit the opening of the suction valve 29. Since this device, as well as various other forms of apparatus capable of limiting and controlling the action of a hygrostatically controlled valve, in accordance with predetermined variations in temperature affecting a thermostat, are and have been well known in the art, per se, no further description thereof is deemed required.

Fig. 5 illustrates a modification of the invention in which the conditioned air is treated by heat exchange with a secondary heat exchange medium, rather than by direct expansion as in the embodiments of the invention hereinabove described. In this form of the invention, there is provided a cooling coil 33 in the upper section 10a of the conditioner casing 10. The cooling coil 33 occupies substantially the entire cross sectional area of the casing section 10a, as described in connection with evaporator 17 which it replaces and the function of which it serves. Similarly, in the lower portion 10b of the conditioner casing 10 there is provided a cooling coil 34 occupying substantially the entire cross sectional area of casing section 10b and replacing the evaporator 18. Air is circulated through the casing 10 of Fig. 5 in the same manner as explained in connection with the preceding figures. A suitable conditioning medium such as cold water or the like, is supplied to the coils 33 and 34 through supply line 35 and through branches 36 and 37 serving coils 33 and 34, respectively. Branch connection 36 is provided with a three-way valve or the like, of any desired construction, designated 38, which is adapted to vary the proportions of liquid received from supply line 35 and from return connection 39 connected to the outlet end of coil 33. Valve 38 is under the control of dry bulb thermostat 28a, which operates in such manner that when additional sensible cooling by the coil 33 is required, the amount of medium supplied to the coil from line 35 will be increased and the amount of medium supplied through line 39 will be decreased. When the thermostat 28a is subjected to a temperature which is lower than that desired, the proportion of medium from line 35 is decreased and the proportion of medium from line 39 is increased. A pump 40 delivers to the coil 33 conditioning medium from the valve 38 for circulation through the coil and for heat exchange with the air circulated in contact with the coil.

Similarly, branch 37 is provided with a three-way valve or the like, 41, for controlling the proportions of conditioning medium drawn from supply line 35 and line 42, connecting to the discharge end of coil 34. Three-way valve 41 is under the control of a hygrostat or wet bulb thermostat 30a which serves to increase the proportion of conditioning medium drawn from the line 35 and to decrease the proportion of medium drawn from line 42 when more dehumidification is required, and to decrease the proportion of medium drawn from line 35 and increase the proportion of medium drawn from line 42 when less dehumidification is required. Pump 43 delivers conditioning medium to the coil 34 from the valve 41, for circulation through the coil and for heat exchange with air circulated in contact therewith.

Conditioning medium which has been circulated through the coils 33 and 34 which is not returned through lines 39 and 42 for recirculation through the coils is returned through conditioning medium return line 44 to a cooling tank or the like, 45. The medium returned to tank 45 is cooled in any desired manner. As illustrated, the returned medium is contacted with the evaporator 46 of a refrigerating system including compressor 47, condenser 48, receiver 49, expansion valve 50 and a thermal bulb or the like, 51, for controlling the operation of the expansion valve 50. Preferably, there is provided a thermostat or the like 52, subjected to the temperature of the cooled conditioning medium for desirably regulating the operation of the refrigerating system in any desired manner, as by interrupting the operation of the compressor whenever the medium in the tank 45 falls below a predetermined low temperature. Pump 53 draws cooled conditioning medium from the tank 45 and delivers it through line 35, for use as above set forth.

In this embodiment of the invention, as in those above described, the conditioning of the air passed through the upper section of the conditioner casing is regulated to provide desired control of the dry bulb temperature in the conditioned enclosure and the coil 34 in the lower section of the conditioner casing is regulated so that the moisture content or relative humidity of the atmosphere of the conditioned enclosure may be desirably regulated. It is to be understood that, if desired, the return lines 39 and 42 may be eliminated, and the three-way valves replaced by modulating valves of any suitable type, to provide desired regulation of the apparatus.

In the foregoing description, the evaporators 17 and 18 and the coils 33 and 34 have each been described as constituting a single coil or expansion device. It is to be understood, however, that any or all of these elements may comprise any number of component sections, arranged either in series and/or in parallel with respect to the flow of refrigerant and the flow of air. Furthermore, while only two heat exchange devices, such as evaporators 17 and 18 and coils 33 and 34, have been illustrated as being arranged in parallel with respect to air flow thereover, it is to be understood that any desired number of such heat exchange devices may be provided and controlled in accordance with the principles above set forth.

Since these and many other changes may be made in the invention without departing from its scope, it is intended that all matter contained in the above description or shown in the accompanying drawing shall be interpreted as illustrative only and not in a limiting sense, applicant limiting himself only as indicated in the appended claim.

I claim:

An air conditioning system of the character described including a casing, a first refrigerant evaporator positioned in said casing and occupying one portion of a cross-sectional area thereof, a second refrigerant evaporator positioned in said casing and occupying another portion of said cross-sectional area thereof, means for passing a stream of air through said casing whereby one portion of the air stream passes in contact with one of the evaporators and another portion of the air stream passes in contact with the other evaporator, means for supplying liquid refrigerant to both of said evaporators, a refrigerant compressor, a common suction connection from said evaporators leading to said compressor, a back pressure regulating valve at the discharge end of the one of the evaporators operative responsive to changes in condition of the air supplied to said evaporator to vary the pressure of the refrigerant in said evaporator, the arrangement of evaporators being such that the pressure of refrigerant in the other evaporator will simultaneously be varied, an automatic pressure regulating valve at the discharge end of the other evaportor to prevent the pressure in said other evaporator from falling below a predetermined point when the pressure in the first evaporator rises above a desired point, and means for mixing and delivering both portions of the air stream to an enclosure to be conditioned.

WILLIAM H. MACDONALD, Jr.